United States Patent [19]

Dye et al.

[11] Patent Number: 5,302,159
[45] Date of Patent: * Apr. 12, 1994

[54] END-THRUST DESIGN FOR PARALLEL-AXIS DIFFERENTIAL

[75] Inventors: James S. Dye, Walworth; Gordon B. Tseng, Rochester, both of N.Y.

[73] Assignee: Zexel-Gleason USA, Inc., Rochester, N.Y.

[*] Notice: The portion of the term of this patent subsequent to Dec. 8, 2009 has been disclaimed.

[21] Appl. No.: 986,100

[22] Filed: Dec. 4, 1992

Related U.S. Application Data

[63] Continuation of Ser. No. 735,441, Jul. 25, 1991, Pat. No. 5,169,370.

[51] Int. Cl.$^5$ ............................................. F16H 1/45
[52] U.S. Cl. ................................... 475/227; 475/226
[58] Field of Search ............... 475/220, 226, 227, 252, 475/333, 335

[56] References Cited

U.S. PATENT DOCUMENTS

| 1,195,314 | 8/1916 | Williams | 475/227 |
| 1,373,657 | 4/1921 | Finefrock | 475/227 |
| 2,000,223 | 5/1935 | DuPras | 74/313 |
| 2,269,734 | 1/1942 | Powell | 74/312 |
| 2,462,000 | 2/1949 | Randall | 74/715 |
| 2,900,846 | 8/1959 | Lehman | 475/227 |
| 2,972,265 | 2/1961 | Walter | 74/711 |
| 3,095,761 | 7/1963 | Hilado | 74/715 |
| 3,292,456 | 12/1966 | Saari | 475/226 |
| 3,706,239 | 12/1972 | Myers | 74/715 |
| 3,738,192 | 6/1973 | Belansky | 74/711 |
| 4,677,876 | 7/1987 | Dissett | 475/226 |
| 4,916,978 | 4/1990 | Razelli et al. | 475/226 |
| 5,169,370 | 12/1992 | Dye et al. | 475/227 |

FOREIGN PATENT DOCUMENTS

| 130806 | 1/1985 | European Pat. Off. | 475/226 |
| 0356401 | 2/1990 | European Pat. Off. | |
| 899549 | 6/1945 | France . | |
| 2256350 | 7/1975 | France . | |
| 2566080 | 12/1985 | France | 475/227 |
| 59-97346 | of 1984 | Japan . | |
| 237300 | 8/1945 | Switzerland . | |
| 27123 | of 1912 | United Kingdom | 475/226 |
| 2234791 | 2/1991 | United Kingdom | 475/227 |

*Primary Examiner*—Leslie A. Braun
*Assistant Examiner*—Ryan W. Massey
*Attorney, Agent, or Firm*—Eugene Stephens & Associates

[57] ABSTRACT

Frictional resistance, resulting from end thrust developed by planetary gearing, is appreciably increased in parallel-axis/torque-proportioning types of automotive differentials to improve torque bias characteristics. A pair of sun gears receive, respectively, the ends of coaxial drive axles, and the sun gears are interconnected by at least one planetary pair of combination gears positioned in the housing circumferentially around the sun gears. Each combination gear of the pair has a first engagement portion that is in mesh with a respective one of the sun gears, and each also has a second engagement portion that is in mesh with its paired combination gear. The first engagement portion of each combination gear is designed to develop end thrust on the combination gear to increase the frictional resistance between an end face of the gear and a bearing surface of the housing whenever the differential is subjected to a torque difference between its respective sun gears; and the gear's second engagement portion is specifically designed so that it develops either (a) no end thrust in a direction opposite to the direction of the end thrust developed by the first engagement portion or (b) end thrust in the same direction.

7 Claims, 5 Drawing Sheets

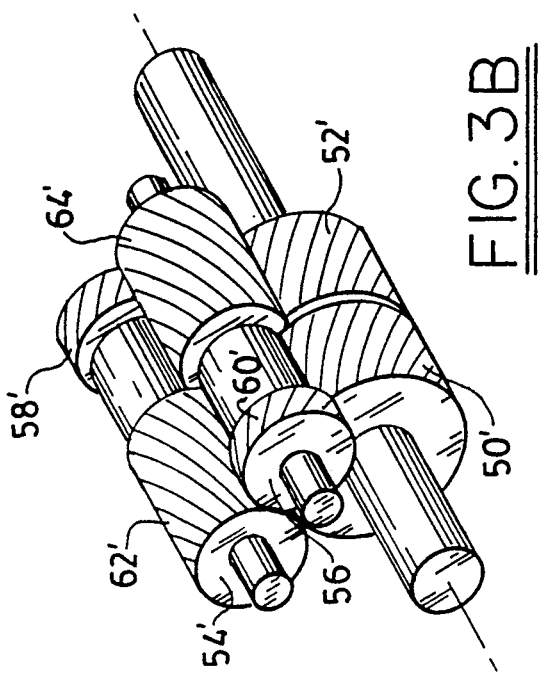
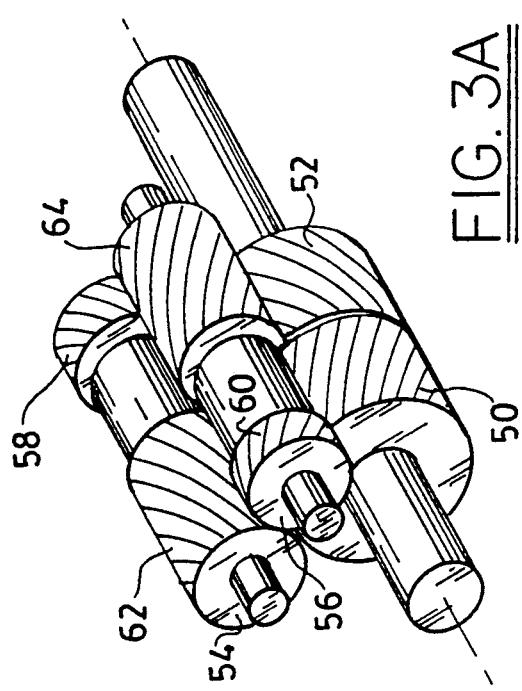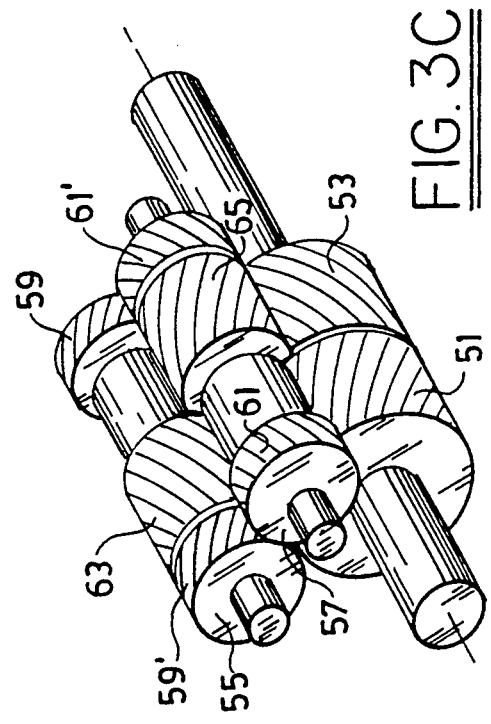

END-THRUST DESIGN FOR PARALLEL-AXIS DIFFERENTIAL

RELATED APPLICATIONS

This application is a continuation of allowed copending application Ser. No. 735,441, now U.S. Pat. No. 5,169,370 filed July 25, 1991, and entitled "End-Thrust Design for Parallel-Axis Differential"; and that copending application is incorporated herein by reference.

TECHNICAL FIELD

The invention relates to torque-proportioning type automotive differentials having planetary gear arrangements carried within housings that are rotatable about a pair of drive axles interconnected by the planetary gear arrangements.

BACKGROUND OF INVENTION

Gear differentials generally include compound planetary gear sets interconnecting a pair of drive axles to permit the latter to rotate in opposite directions with respect to a differential housing. The drive axles rotate about a common axis; and so-called "side" gears are fixed for rotation with the inner ends of the two drive axles, such side gears acting as the sun gear members of the compound planetary gear sets. The sun gears are interconnected by so-called "element" or "combination" gears, which form the planet gear members of the sets. The planet gears are mounted for rotation about axes that may be variously offset and inclined with respect to the common axis of the sun gears and drive shafts.

The relative positions of the sun and planet gear axes usually determine the kind of gearing that make up the planetary gear sets: Parallel axes are used for mounting spur or helical gears, e.g., see U.S. Pat. Nos. 2,269,734 (Powell); 2,972,265 (Walter); and 3,095,761 (Hilado); and orthogonal axes are used for mounting either bevel or worm gears, depending upon the presence of any offset between the axes. That is, bevel gears are used when the sun and planet gear axes intersect, while worm gears are used when the gear axes do not intersect (as an example of this latter type, see U.S. Pat. No. 1,373,657 to Finefrock).

The entire planetary gearing arrangement within the differential supports opposite relative rotation between the drive axle ends (i.e., differentiation), which is necessary to permit the axle ends to be driven at different speeds. Torque transmitted to the drive axles through the inclined tooth surfaces of the sun gears generates thrust forces against gear-mounting bearing surfaces within the differential. (Such bearing surfaces may comprise journals formed in the housing, or may be the ends of bores into which the gears are received, or may be special washers positioned between the end faces or shaft ends of the gears and the housing.) The thrust forces, together with other loads conveyed by the gear meshes in the planetary gearing, produce a frictional resistance to relative rotation between the drive axles, this frictional resistance being proportional to the torque applied to the differential housing. The proportional frictional resistance supports different amounts of torque between the two drive axles to prevent their relative rotation until the characteristic "bias" ratio of the planetary gearing arrangement is reached. Once the frictional resistance is overcome and differentiation begins, the torque difference between the axles is proportioned in accordance with the bias ratio. Differentials that divide torque in a substantially constant ratio between relatively rotating drive axles are referred to as "torque-proportioning" differentials.

The ability to support different amounts of torque between the drive axles is of great benefit to improving traction capabilities of vehicles. Ordinarily, when one wheel of a vehicle with a conventional differential loses traction, the amount of torque that can be delivered to the other drive wheel is similarly reduced. However, when one wheel loses traction so that there is differentiation between the two axles, torque-proportioning differentials deliver an increased amount of torque to the drive wheel having better traction, such increased torque being determined by the characteristic bias ratio of the differential.

A wide variety of torque-proportioning differentials were developed more than seventy-five years ago to facilitate automotive travel over the muddy, unpaved roads that were used to supply the trenches in World War I; and these early designs have been improved over and over again since that time. Some well-known designs use planetary gearing assemblies with orthogonal axes (e.g., the above-cited Finefrock Patent), while others use gearing assemblies with parallel axes. Examples of the latter type are the above-cited Powell, Walter, and Hilado Patents as well as U.S. Pat. Nos. 1,195,314 (Williams); 2,000,223 (DuPras); 2,462,000 (Randall); and, more recently, 3,706,239 (Myers), this latter design supporting the gears in housing pockets rather than by shafts received in conventional journal bores.

In general, the gears used in parallel-axis/helical gear assemblies are often simpler to manufacture than are the gears used in torque-proportioning designs of the orthogonal-axis/worm-gear type. However, when the latter are made with the same number of sun and planet elements as the former, they usually develop greater frictional resistance between their respective gear meshes and support bearings; and this, in turn, provides greater torque bias and/or increased control over the bias ratio. A significant portion of the torque bias of such orthogonal-axis designs is related to the frictional resistance developed by the cumulative axial forces (hereinafter referred to as "end thrust") developed by their sun gears and by their planet gears when the differential is subjected to torque. In contrast, such cumulative end thrust has not heretofore been a significant contributor to the torque bias developed by parallel-axis designs.

That is, even though there are several basic prior-art designs for parallel-axis differentials of the torque-proportioning type which make use of the frictional resistance generated by end thrust, we are aware of none that utilizes cumulative end thrust developed by both sun and planet gears for the purpose of creating a substantial portion of the torque bias between the axles. For instance, one of these basic designs is exemplified by the above-cited U.S. Patents to DuPras, Powell, Randall, Walter, and Myers. In this basic prior-art design, helical sun gears of opposite hand are in mesh with one or more pairs of helical planet combination gears which, in turn, are in mesh with each other. While this design produces end thrust on the sun gears, no significant end thrust is developed by the planet gear pairs due to the fact that the end thrust created by the helical teeth in mesh with the sun gear is opposed by a contrary end thrust created by the same hand helical teeth which are used for the interconnection between the planet gear pair.

A second basic parallel-axis design is exemplified by the torque-proportioning differentials disclosed in the above-cited U.S. Patents issued to Williams and Hilado. In this second basic design, the pairs of planet gears mesh with each other by means of helical gearing, while using spur gear teeth for the meshing connection with their respective sun gears. This prior-art arrangement produces end thrust on the planet combination gears, but it does not develop any significant end thrust on the sun gears.

There are other known designs for parallel-axis/torque-proportioning differentials in which, instead of mounting the planet gears in pairs, the gears are mounted in a continuous circular mesh around the full circumference of each respective side gear, e.g., see U.S. Pat. No. 3,738,192 (Belansky). However, like the two basic designs just discussed above, none of these continuous circular mesh designs is directed to controlling the cumulative end thrust independently developed by both sun and planet gears for the purpose of creating a substantial portion of the torque bias.

Our invention provides such parallel-axis/torque-proportioning differentials with simple modifications which maximize utilization of the cumulative end thrust developed by both sun and planet gears for the purpose of creating a significant portion of the differential's torque bias and for permitting increased control over bias ratio.

SUMMARY OF THE INVENTION

The invention comprises improved parallel-axis planetary gearing for use in automotive differentials of the torque-proportioning type. The sun gears of the differential, which are adapted to be fixed to the ends of the coaxial drive axles, are interconnected by at least one planetary pair of combination gears. Each combination gear of the pair has two engagement portions: a first portion having helical teeth for meshing with a respective one of the sun gears, and a distinct second engagement portion for meshing with its paired combination gear. This second meshing portion is designed with either spur or helical teeth of the opposite hand.

The invention makes simple modifications to the design of these meshing engagement portions of the gears to provide greater torque bias between the interconnected axles than has heretofore been achieved with similar parallel-axis differentials. This additional torque bias is created by increasing the cumulative frictional resistance resulting from end thrust developed by the differential's various gear components. Each planet gear is mounted in the differential housing for rotation about an axis parallel to the common axis of the axles, and for axial motion (a) in relation to, and for contact with, at least one bearing surface, and (b) in relation to its paired planet gear. That is, each planet gear is free to move axially in response to the end-thrust forces developed by the gearing assembly for increasing frictional resistance to the relative rotation of the axles.

The first engagement portion of each combination gear is provided with helical teeth designed to develop axial end thrust in the direction of a bearing surface when the combination gear is subjected to torque. Further, the second engagement portion of each combination gear is specifically designed with gear teeth which develop no end thrust in a direction opposite to the end thrust developed by the gear's first engagement portion. Therefore, each helical sun gear and each planet combination gear develops end thrust whenever torque is transferred between the respective axles; and this cumulative end thrust is not diminished by the reaction forces acting on the gear mesh which interconnects each pair of combination gears. That is, the invention's simple modifications to the design of the planet gears of parallel-axis/torque-proportioning differentials improves such differentials for the first time so that the combined end thrust exerted by the planet gears is at least equal to the end thrust exerted by the sun gears; and in some embodiments of the invention, the end thrust exerted by the planet gears is greater than the end thrust exerted by the sun gears.

In the simplest embodiments of the invention, the areas of meshing connection between each pair of combination gears, i.e., their second engagement portions, are designed with either spur gear teeth or with helical teeth having helix angles of opposite hand to the helical teeth that comprise the first engagement portions which mesh with the sun gears. By virtue of this arrangement, torque delivered to the helical sun gears develops (a) end thrust on each of the sun gears and (b) an oppositely directed end thrust on its respective meshing planet combination gear.

If the inventive design includes spur gears for the meshing connection between the paired combination gears, the spur teeth do not develop any end thrust and, therefore, do not diminish the end thrust developed by the helical teeth of each combination gear's first engagement portion. On the other hand, if the second engagement portions of each combination gear pair are designed with helical teeth of opposite hand to the helical teeth of their respective first engagement portions, these latter teeth also develop end thrust; and this additional end thrust is in the same direction as the end thrust developed by the helical teeth of the first engagement portion. Therefore, in the second arrangement, each combination gear develops even greater end thrust to add to the cumulative frictional resistance for creating the desired torque bias between the axles.

The invention is also applicable to parallel-axis differential assemblies using a unique type of combination gear in which the second engagement portion of each combination gear, i.e., the portion in mesh with its paired combination gear, is divided into two separate and distinct meshing areas that straddle the first engagement portion which is in mesh with the sun gear. (This unusual form of planet combination gear is disclosed in commonly-assigned U.S. Pat. No. 5,122,101, issued June 16, 1992 to Gordon Bae-Ji Tseng and entitled "Parallel-Axis Combination Gear Differential", the disclosure of which is hereby incorporated by reference.) The detailed disclosure below includes three embodiments of such straddle-type combination gears. In two of these embodiments, the second engagement portions of each combination gear have gear tooth designs which either result (a) in no end thrust or (b) in developing end thrust that is in the same direction as the end thrust developed by the combination gear's first engagement portion. Therefore, in both of these further embodiments, a significant part of the torque bias between the axles is based upon frictional resistance resulting from the cumulative end thrust developed by the sun gears and by each of the planet combination gears.

Still another embodiment comprises a multi-stage, parallel-axis differential (of the type disclosed in commonly-assigned U.S. Pat. No. 5,098,356, issued March 24, 1992 to Sandro Guidoni et al. and entitled "Multi-Stage Torque Proportioning Differential") in which spring bias is used to position the sun gears and planet gears to selectively control contact between the gears and/or with their respective bearing surfaces under different torque conditions. For example, as the torque being transferred between the axles the sun gears of this multi-stage differential increases, the end thrust developed in the gear elements overcomes the spring bias to allow contact between the gears and/or their bearing surfaces, thereby increasing the differential's frictional resistance to relative rotation. Thus, this type of differential has a first torque bias characteristic for low torque conditions and a second stage of bias for higher torque conditions. In a further embodiment of the invention disclosed herein, a Guidoni et al. type of differential is modified to increase the end thrust developed by the combination gears, such increase being achieved by selecting appropriate gear tooth designs for their first and second engagement portions.

DRAWINGS

FIGS. 1a and 1b are schematic perspective views of the simplified planetary gear assemblies of two basic designs of prior-art parallel-axis/torque-proportioning differentials; and FIGS. 1c and 1d are similar views of two such differentials modified according to the invention.

FIGS. 2a, 2b, 2c, and 2d are schematic diagrams relating, respectively, to the planetary gear assemblies shown in FIGS. 1a, 1b, 1c, and 1d and showing the direction of end-thrust forces in each such assembly under the same assumed torque conditions.

FIG. 3a is a schematic perspective view of the simplified planetary gear assembly of a different design of parallel-axis/torque-proportioning differential; and FIGS. 3b and 3c are two similar views of such a differential modified according to the invention.

FIGS. 4a, 4b, and 4c are schematic diagrams relating, respectively, to the planetary gear assemblies shown in FIGS. 3a, 3b, and 3c and showing the direction of end-thrust forces in each such assembly under the same assumed torque conditions.

FIG. 5 is a schematic cross-sectional view of a portion of still another design of parallel-axis/torque-proportioning differential modified according to the invention.

DETAILED DESCRIPTION

Figure 1A:
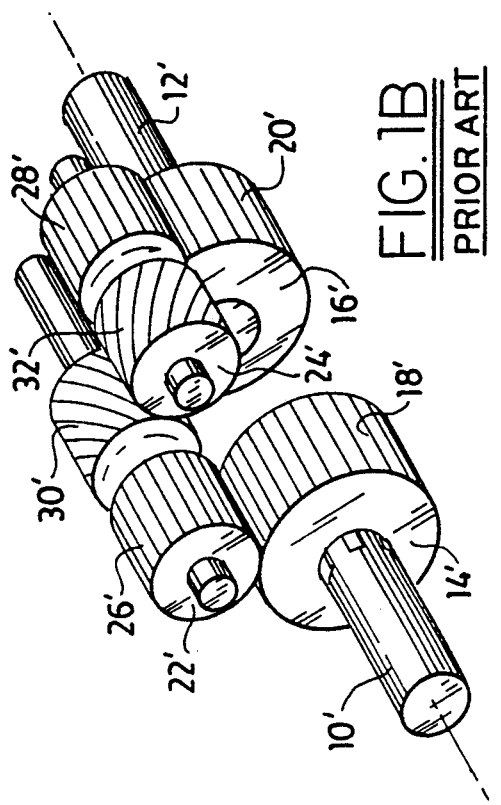
Figure 1C:
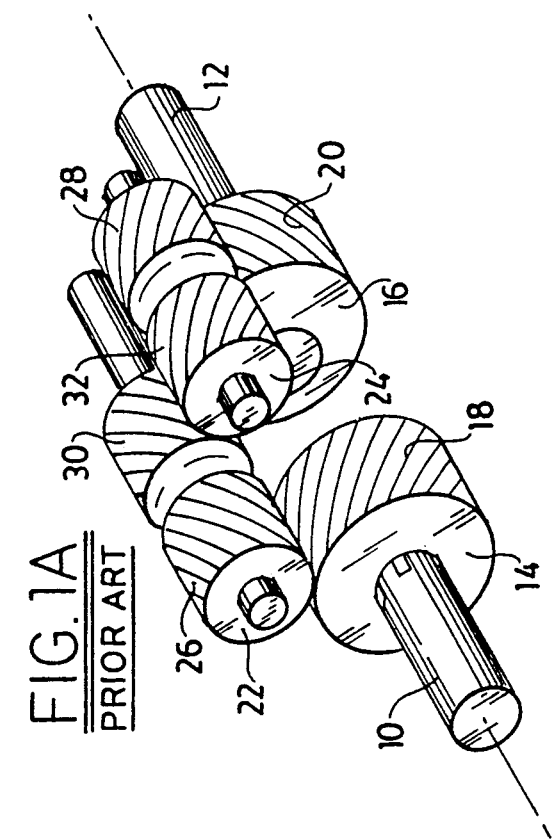
Figure 1B:
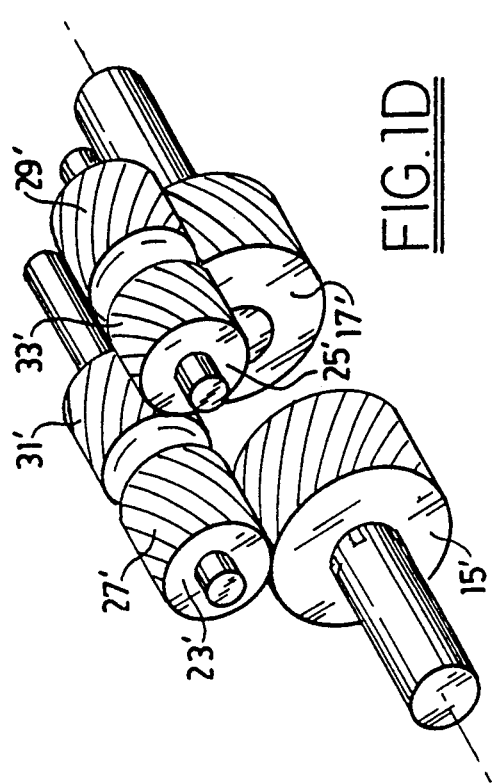

FIGS. 1a and 1b show the planetary assemblies of the two basic types of parallel-axis differentials referred to above in the Background section.

Referring to the planetary arrangement shown in FIG. 1a, a pair of axles 10, 12 are splined to a respective pair of helical sun gears 14, 16. Sun gear 14 has teeth 18 having a right hand helix angle, while sun gear 16 has teeth 20 with a left hand helix angle. Sun gears 14, 16 mesh, respectively, with the first engagement portions 26, 28 of a pair of planet combination gears 22, 24 which are also each provided with a second engagement portion 30, 32, these latter engagement portions being in mesh with each other. In this prior-art design, both the first and second engagement portions of each of the combination gears have similar helix angles. That is, first engagement portion 26 of combination gear 22 has left hand helical teeth designed to mesh with the right hand helical teeth 18 of sun gear 14, and the second engagement portion 30 of combination gear 22 is also provided with left hand helical teeth. In contrast, first engagement portion 28 of combination gear 24 has right hand helical teeth designed to mesh with the left hand helical teeth 20 of sun gear 16. Second engagement portion 32 of combination gear 24 also has right hand helical teeth appropriate to mesh with the left hand helical teeth of portion 30 of combination gear 22.

In the prior-art design illustrated in FIG. 1b, the planetary arrangement is similar to the just-described prior-art arrangement shown in FIG. 1a; and similar reference numerals have been assigned to the respective sun and planet gears. The primary differences between these two prior-art assemblies lies in the design of the teeth of their respective gears. Namely, sun gears 14', 16' are both provided with spur teeth 18', 20' which mesh, respectively, with similar spur gear portions 26', 28' of combination gears 22', 24'. The second engagement portions 30', 32', which are used to interconnect the combination gears with each other, are provided with mating left and right hand helical teeth.

Figure 2B:
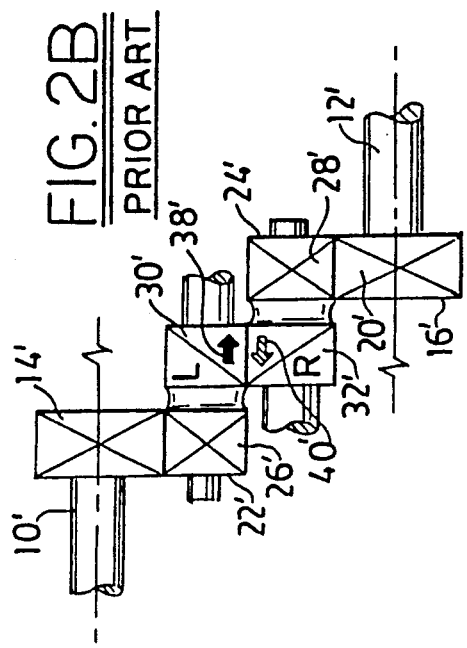
Figure 2D:
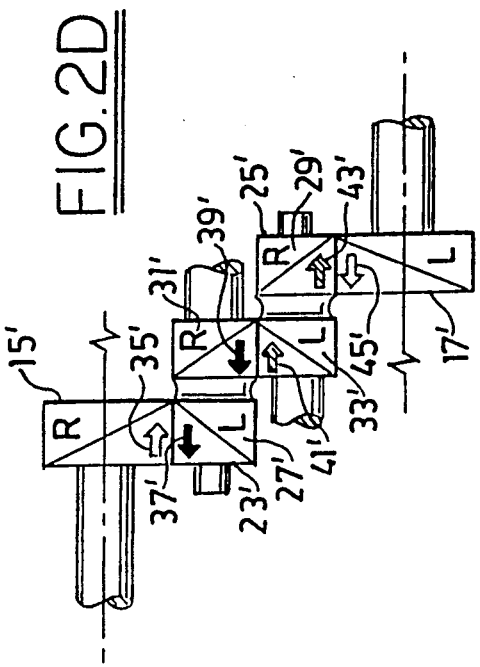
Figure 2A:
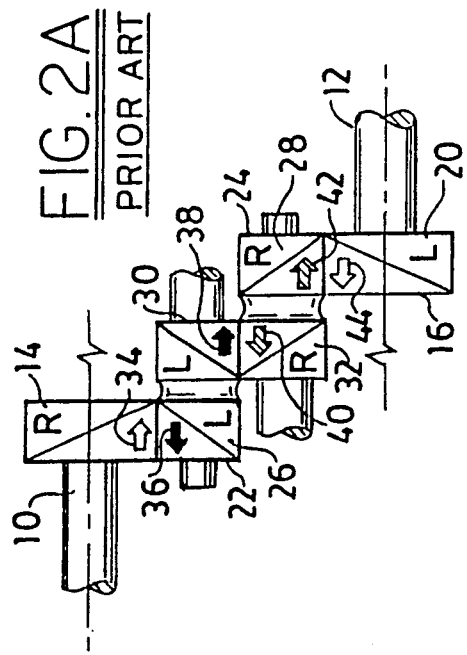

Reference is now made to FIGS. 2a and 2b which, respectively, schematically diagram the end-thrust forces developed by the just-described prior-art assemblies shown in FIGS. 1a and 1b. In these schematics, the common axis of the sun gears has been separated for simplification, sun gears 14, 14' being shown at the top of each diagram, while sun gears 16, 16' are positioned at the bottom of each diagram. In FIGS. 2a and 2b, as well as in all of the other schematic force diagrams in FIGS. 2, 4, and 5, it is assumed (a) that the differential is in a "drive" (as distinguished from "coast") mode, the vehicle being driven forward by its engine, and (b) that torque is divided between the two axles such that the sun gear with the lower reference numeral is being subjected to the greater torque in a clockwise direction when viewed from the left hand side of the drawing. Also, as used in the following description and claims, the term "end thrust" is intended to describe only those axial forces which arise due to the helix angle of the gearing. That is, this term ignores the generally less significant end-thrust forces that occur due to mesh friction, slight axial misalignments, etc.

Further, to facilitate understanding of the determination of end thrust in the force diagrams, reference can be made to Table 1 (taken from *Gear Handbook* by Darle W. Dudley, Editor, First Edition, McGraw-Hill Book Co., 1962) which indicates the direction of axial thrusts on driving and driven helical gears.

TABLE 1

| Direction of Axial Thrusts on Driving and Driven Gears | | | |
|---|---|---|---|
| Hand of Spiral | Direction of Rotation | Driving | Driven |
| Left | Clockwise | Toward viewer | Away from viewer |
|  | Counter-clockwise | Away from viewer | Toward viewer |
| Right | Clockwise | Away from viewer | Toward viewer |
|  | Counter-clockwise | Toward viewer | Away from viewer |

Therefore, in the schematically illustrated prior-art planetary assembly of FIG. 2a, it is assumed that gear 14 is subjected to greater torque than gear 16, that gear 14 is a driving gear, and that gear 16 is a driven gear. Also, it is assumed that the torque is acting on gear 14 in a clockwise direction. In view of the right hand spiral of its helical teeth 18, an end thrust is developed on gear 14 in the direction of open arrow 34. Since gear 14 is in mesh with the left hand helical teeth of first engagement portion 26 of gear 22, driving the latter gear in a counterclockwise direction, this subjects gear 22 to end-thrust forces in the direction of solid arrow 36. The left hand teeth of second engagement portion 30 of gear 22 are also subjected to a counterclockwise torque, but portion 30 is in driving relation to the teeth of paired combination gear 24. This produces end-thrust forces on combination gear 22 in the direction of solid arrow 38; and the right hand teeth of second engagement portion 32 of combination gear 24, being driven in a clockwise direction, develop end-thrust forces indicated by hatched arrow 40. The right hand teeth of first engagement portion 28 of combination gear 24 drive the left hand helical gear teeth 20 of sun gear 16, this latter mesh resulting in end-thrust forces on combination gear 24 and sun gear 16 in the respective directions indicated by hatched arrow 42 and open arrow 44.

Therefore, while the prior-art assembly shown in FIGS. 1a and 2a develops end thrust on sun gears 14, 16, it can be seen from solid arrows 36, 38 and hatched arrows 40, 42 that the end-thrust forces acting on each of the two combination gears 22, 24 are in opposition, resulting in no appreciable effective end thrust being developed by either of these planet gears.

FIG. 2b is a schematic force diagram relating to the prior-art planetary assembly shown in FIG. 1b in which both sun gears 14', 16' and the first engagement portions 26', 28' of combination gears 22', 24' are all provided with spur teeth. Therefore, the clockwise driving torque experienced by sun gear 14' does not result in the development of any end thrust on either gear 14' or on the driven portion of combination gear 22'. However, the counterclockwise torque to which combination gear 22' is subjected causes the left hand helical teeth of portion 30' of gear 22' to drive the right hand helical teeth of portion 32' of gear 24' in a clockwise direction, resulting in respective end-thrust forces indicated by solid arrow 38' and hatched arrow 40'. Again, the meshing engagement of the spur teeth of sun gear 16' and portion 28' of combination gear 24' do not produce any end-thrust forces. As a result, the sun gears in this prior-art arrangement do not develop end-thrust forces, but each of the planet gears develops the respective end-thrust forces just identified above.

Figure 1D:
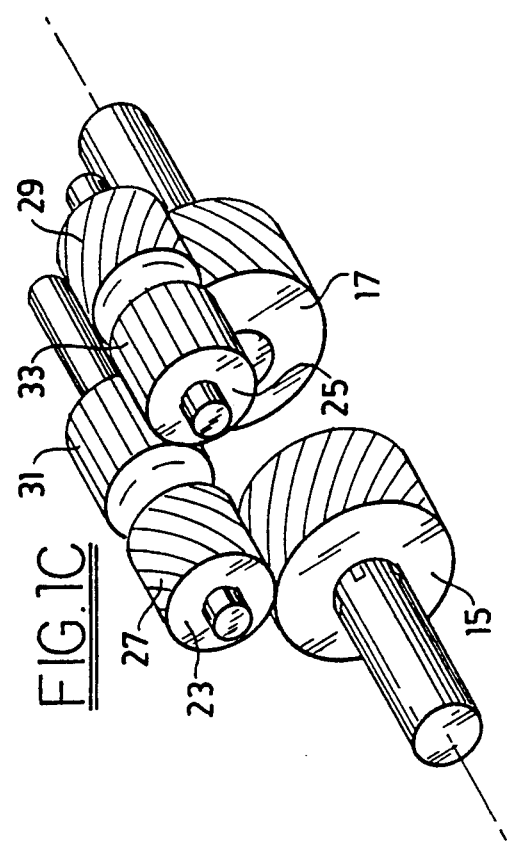

It can be seen from FIGS. 2a and 2b that the two basic prior-art planetary gear assemblies develop significant end thrust on either the sun gears or the planet combination gears, but do not provide such end thrust cumulatively on both the sun gears and the planet gears. However, it is exactly such cumulative end thrust that is provided by the invention herein. FIGS. 1c and 1d disclose two simplified embodiments of the invention which, while similar to the prior-art assemblies just discussed above, include modifications that provide the inventive assemblies with significantly more end thrust for increasing frictional resistance and, thereby, augmenting the characteristic bias of the differential.

Figure 2C:
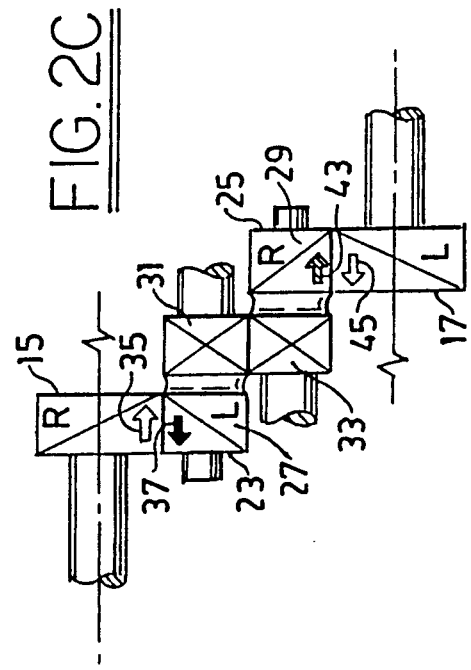

In the inventive embodiment shown in FIG. 1c, the pair of sun gears 15, 17 has respective sets of helical teeth with opposite hand spirals; and these gears are in mesh with the first engagement portions 27, 29 of a pair of planet combination gears 23, 25 which are interconnected by means of the meshing spur teeth of their respective second engagement portions 31, 33. The end-thrust forces resulting from this gear arrangement are illustrated in FIG. 2c. Applying the same assumptions used above in regard to the analysis of the prior-art assemblies, right hand helical sun gear 15 is subject to a clockwise torque, and this imparts a counterclockwise torque to driven portion 27 of combination gear 23 and produces the relative end-thrust forces indicated by open arrow 35 and solid arrow 37, respectively. While portion 33 of combination gear 25 is driven clockwise by the counterclockwise torque from portion 31 of combination gear 23, these spur gears do not develop any end thrust. However, the mesh between the driving right hand helical gear portion 29 of combination gear 25 and the driven left hand helical teeth of sun gear 17 develops the end-thrust forces on their respective gears as indicated by hatched arrow 43 and open arrow 45. As indicated by the thrust arrows in FIG. 2c, the embodiment disclosed in FIG. 1c develops end thrust on both sun gears and on both planet combination gears. Thus, the relatively simple change of gear tooth arrangements, as compared to the prior-art assembly shown in FIG. 2b, has resulted in an appreciable increase in the frictional resistance of the assembly by adding to the frictional resistance between the sun and planet gears and their respective bearing surfaces. (NOTE: While FIGS. 1 through 4 omit these respective bearing surfaces, the relationship between the sun and planet gears and their respective bearing surfaces will be understood by persons skilled in the art, and this relationship is shown for one specific embodiment described below and illustrated in FIG. 5.)

The embodiment shown in FIG. 1d is similar to that just shown in FIG. 1c in that sun gears 15', 17' have right and left hand helical teeth, respectively, which mesh with left and right hand helical portions 27', 29' of combination gears 23', 25'. However, instead of being interconnected by spur teeth, the second engagement portion 31' of combination gear 23' has right hand helical teeth and meshes with the left hand helical teeth of portion 33' of combination gear 25'.

As can be seen from the schematic force diagram in FIG. 2d, the mesh between driving sun gear 15' and driven portion 27' of combination gear 23' develops end thrust (indicated by arrows 35' and 37') similar to the end thrust developed in the first embodiment of the invention shown in FIG. 1c; and the mesh between driving portion 29' of combination gear 25' and sun gear 17' produces similar end thrust on each of these gears as indicated by arrows 43' and 45'. However, in this embodiment, the respective right and left hand helical teeth of second engagement portions 31', 33' of the combination gears produce additional end thrust indicated by arrows 39', 41'. Since the resulting end thrust developed by both portions 27', 31' of combination gear 23, (indicated by arrows 37', 39') is in the same direction, appreciable additional friction is developed between combination gear 23' and its bearing surface within the differential housing (not shown). Similarly, the end-thrust forces developed by both portions 29', 33' of combination gear 25' (indicated by hatched arrows 41', 43') are also in the same direction, thereby adding appreciably to the frictional resistance between the latter combination gear and its respective bearing surface.

When this second embodiment of the invention is compared to the similar prior-art assembly analyzed in FIG. 2a, it becomes quite apparent that the relatively simple design modifications of the invention produce a significant increase in the differential's effective end-thrust forces.

Reference is now made to the differential assembly in FIG. 3a which is a schematic representation, in simplified perspective view, of the parallel-axis planetary gearing arrangement disclosed in the commonly-assigned U.S. Patent entitled "Parallel-Axis Combination Gear Differential" referred to above. In this torque-proportioning differential, the helical sun gears 50, 52 are interconnected by a pair of planet combination gears 54, 56. Each combination gear is in mesh with a respective one of the sun gears, and the paired combination gears are also in mesh with each other at two separate meshing areas. This relationship can best be seen in the symbolic diagram illustrated in FIG. 4a in which, for purposes of simplification, the basic planetary arrangement has been unwrapped so that the two sun gears 50, 52 are shown at the top and bottom of the symbolic arrangement, their common axis having been split as indicated in the manner similar to that used in the FIG. 2 schematics.

Figure 4C:
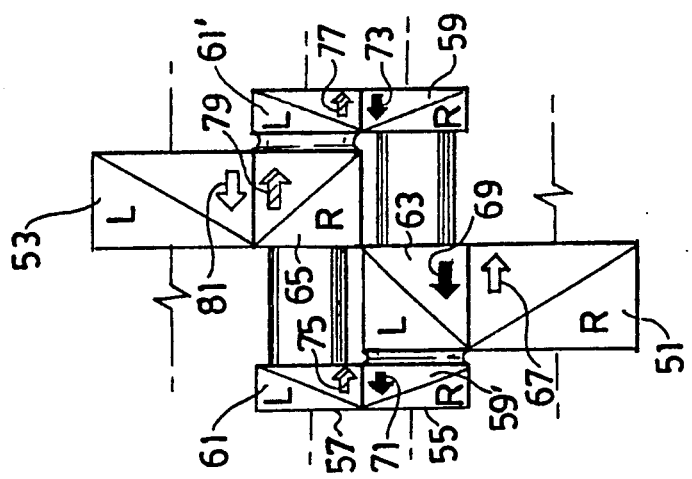
Figure 4B:
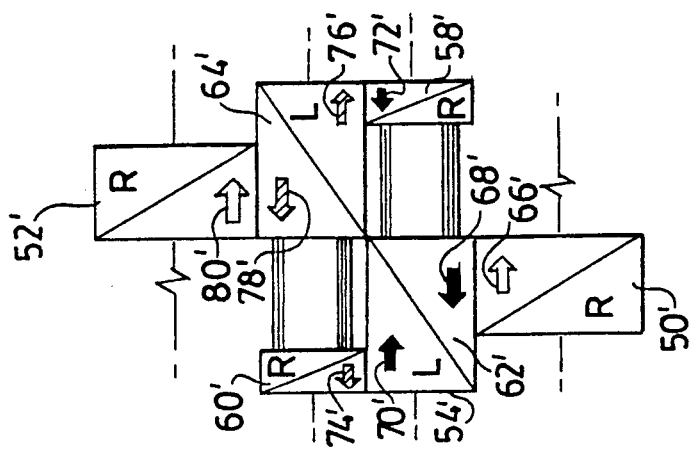
Figure 4A:
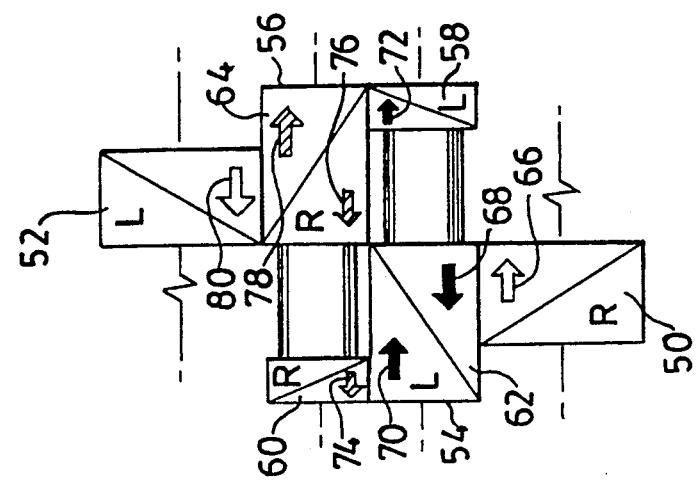

Referring to FIGS. 3a and 4a, each combination gear 54, 56 has a respective axial end portion 58, 60 which meshes with the opposite end portion of its paired gear. At the opposite end of each combination gear is an elongated contiguous meshing area 62, 64 which is in mesh with each gear's respective sun gear 50, 52 as well as with the axial end portion 58, 60 of its paired combination gear. To describe this arrangement in terminology similar to that used above in the explanations of the gear assemblies illustrated in FIGS. 1a through 2d, the second engagement portions of combination gears 54, 56 (i.e., the portions which are in mesh with each other) are split into two distinct areas which straddle the first engagement portions that are in mesh with their respective sun gears. Each elongated contiguous meshing area 62, 64 thus serves as both the first engagement portion and as one-half of the second engagement portion of each planet combination gear 54, 56. This novel arrangement is explained in greater detail in the disclosure of the commonly-assigned application just identified above, which disclosure is incorporated herein by reference.

In the assembly shown in FIG. 3a, the elongated meshing portion 62, 64 and the axial end portion 58, 60 of each planet combination gear have helical teeth of the same hand, both portions of gear 54 having left hand helical teeth and those of gear 56 having right hand helical teeth. FIG. 4a shows the end-thrust forces developed when torque driven by sun gear 50 is transferred through this assembly. Again, reference is made to Table 1, and it is assumed that gear 50 is subjected to a clockwise torque when the assembly is viewed from the left.

The clockwise driving rotation of gear 50 develops the end thrust indicated by open arrow 66, while the driven left hand helical teeth of elongated meshing portion 62 develop end thrust in the direction of solid arrow 68. At the same time, the portions of combination gear 54 which are in mesh with its paired combination gear 56 develop end thrust indicated by solid arrows 70, 72. The two separated sets of driven right hand helical teeth of combination gear 56 produce end thrust indicated by shaded arrows 74, 76, while the driving right hand helical teeth of portion 64 develop end thrust in the direction of shaded arrow 78. The driven left hand helical teeth of sun gear 52 develop end thrust in the direction of open arrow 80. The aggregation of these end-thrust forces results in increased frictional resistance between sun gears 50, 52; but little, if any, end thrust is developed over either of the combination gears due to the opposite directions of end thrust indicated by the respective sets of solid and hatched arrows.

Referring now to FIGS. 3b and 4b, the assembly of FIG. 3a has been modified in accordance with the invention. In this embodiment, sun gears 50', 52' both have right hand helical gears, while the axial end portions 58', 60' of each planet combination gear 54', 56' have helical teeth of opposite hand to the teeth of elongated meshing portions 62', 64'. When this modified assembly is subjected to similar torque transfer conditions as that just assumed in the explanation above relating to FIGS. 3a and 4a, end thrusts are developed on sun gears 50', 52' in the direction of open arrows 66', 80'; and each of the combination gears is subjected to increased end thrust, namely, the end thrust developed by each respective axial end portion 58', 60' (indicated by solid arrow 72' and hatched arrow 74') supplements rather than opposes the significant end thrust developed in response to the mesh with each respective sun gear (indicated, respectively, by solid arrow 68' and hatched arrow 78').

FIGS. 3c and 4c illustrate a further modification of the assembly in accordance with the invention. In this embodiment, each elongated contiguous meshing area (in mesh with both a respective sun gear and the axial end portion of its paired combination gear) is divided into two distinct meshing areas 59'/63 and 61'/65, each having a respective gear tooth design. Sun gears 51, 53 have respective right and left hand helical teeth which are in mesh with the first engagement portions 63, 65 of combination gears 55, 57. The divided second engagement portion of each combination gear, namely, axial end portions 59, 59' of gear 55 and axial end portions 61, 61' of gear 57, each have helical teeth of similar hand spiral. With this gear arrangement, the sun gears are thrust against each other as indicated by open arrows 67, 81, while the frictional resistance between each planet combination gear and its respective bearing surface is maximized by the cumulative end thrusts indicated by the respective sets of solid and hatched arrows, namely, the left hand helical teeth of first engagement portion 63 of gear 55 develop end thrust in the direction of solid arrow 69, while the driving right hand helical teeth of axial end portions 59, 59' both develop axial end thrust in the same direction, as indicated by solid arrows 71, 73. Similarly, the left hand helical teeth of end portions 61, 61' of gear 57 are driven clockwise and produce end-thrust forces indicated by hatched arrows 75, 77, the latter being in the same direction as the end-thrust forces developed by driving right hand helical portion 65 (indicated by hatched arrow 79).

Once again, it can be seen that the invention's simple modifications (in FIGS. 3b and 3c) of the original assembly illustrated in FIG. 3a have resulted in significant increases in end-thrust related frictional resistance.

Figure 5:
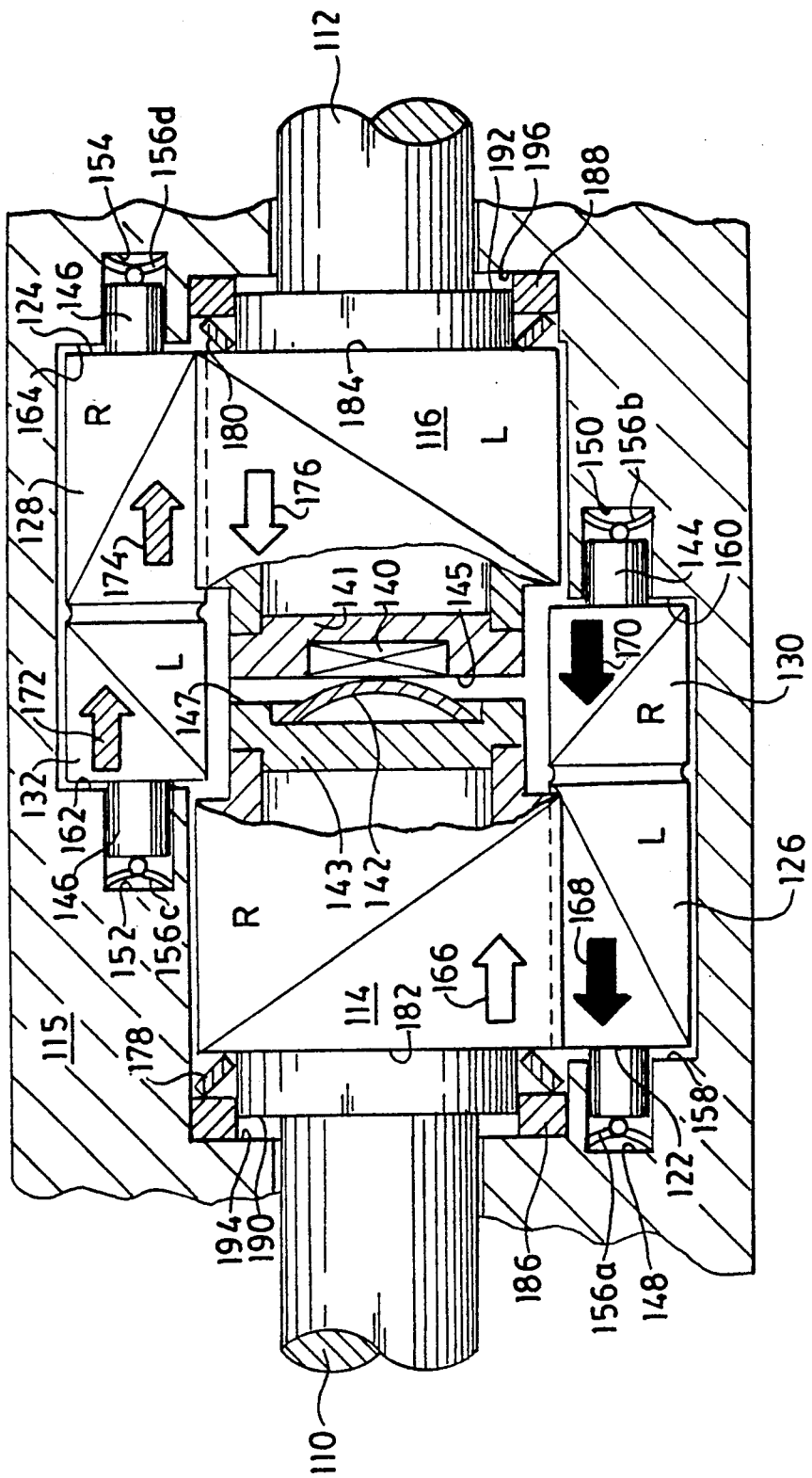

Still another embodiment of the invention is shown schematically in FIG. 5, the various gear elements of this planetary assembly being shown mounted in an appropriate housing. While the housing was omitted from each of the previous drawings to simplify the illustration, each of the previous assemblies include similar housings for supporting the various gear elements and for providing appropriate bearing surfaces to create the frictional resistance needed for producing the torque bias appropriate for torque-proportioning operation.

In FIG. 5, the planetary arrangement includes two pairs of combination gears disposed 180° apart around the circumference of the two sun gears. This embodiment is a modification of the basic structure disclosed in the above-cited commonly-assigned U.S. Patent issued to Sandro Guidoni et al.

The ends of axles 110, 112 are received, respectively, by a pair of sun gears 114, 116 positioned coaxially within a housing 115. As in the other embodiments discussed above, each pair of planetary combination gears is in mesh with each other and, respectively, with one of the sun gears. Combination gear 122 has a first engagement portion 126 with left hand helical teeth which are in engagement with the right hand helical teeth of sun gear 114 and a second engagement portion 130 which meshes with the second engagement portion 132 of its paired combination gear 124. (NOTE: Only one combination gear of each pair is shown in this schematic.) The first engagement portion 128 of combination gear 124 has right hand helical teeth which mesh with the left hand helical teeth of sun gear 116.

In this assembly, the opposed inner-end faces of sun gears 114, 116 are provided with respective bushings 141, 143; and sun gears 114, 116 are biased away from each other by a spring assembly comprising a bearing plate 140 and a Bellville spring 142 supported, respectively, in bushings 141, 143. Planet combination gears 122, 124 are fixed to respective shafts 144, 146 which are spring biased away from the ends of respective journal bores 148, 150, 152, and 154 by Bellville spring/ball bearing elements 156a, 156b, 156c, and 156d. The bias provided by spring elements 156 is sufficient to maintain the end faces of combination gears 122, 124 out of contact with bearing surfaces 158, 160, 162, and 164 when the differential assembly is subjected to low torque conditions.

Making the same assumptions as above, namely, that torque is being transferred through the differential from left sun gear 114 to right sun gear 116 and that the torque is clockwise when viewed from the left side of the drawing, the right hand helical teeth of sun gear 114 develop the end thrust indicated by open arrow 166. The mating left hand helical teeth of first engagement portion 126 of combination gear 122 develop end torque in the opposite direction, as indicated by solid arrow 168. Second engagement portion 130 of gear 122 has right hand helical teeth which drive the left hand helical teeth of mating combination gear 124, developing end-thrust forces on gears 122, 124 in the directions shown, respectively, by solid arrow 170 and hatched arrow 172. First engagement portion 128 of combination gear 124 has right hand helical teeth and is in driving relationship to the left hand helical teeth of sun gear 116, thereby developing end thrust on each of these respective gears in the direction of the hatched arrow 174 and open arrow 176.

It can be seen that the end-thrust forces developed on sun gears 114, 116 are opposed; and, under higher torque conditions, these forces are sufficient to overcome the relatively light spring bias of Bellville spring 142, permitting the end faces 145, 147 of bushings 141, 143 of the two sun gears to come into contact and, thereby, increasing the frictional resistance between them. Similarly, the end-thrust forces developed by the two engagement portions of combination gear 122 are in the same direction, and these forces are sufficient to overcome the bias of spring element 156a mounted in the end of journal bore 148 to permit the left end face of gear 122 to contact bearing surface 158.

The end-thrust forces developed by combination gear 124 are also both in the same direction, but opposite to the forces developed upon its paired combination gear 122. The combined end forces acting on gear 124 overcome the bias of the spring element 156d mounted in the end of journal bore 154 and, thereby, permit the right hand end face of gear 124 to come into contact with bearing surface 164. The contact between the respective end surfaces of gears 122, 124 and their respective bearing surfaces 158, 164 add appreciably to the frictional resistance, i.e., torque bias, of this differential embodiment whenever torque is being transferred between the axles.

As indicated above, it has been assumed that the vehicle is being driven forward by its engine and that torque is being divided between the axles such that the sun gear with the lower reference numeral is being subjected to the greater torque in a clockwise direction when viewed from the left hand side of the drawing. It should be noted that if, instead, the opposite sun gear were being subjected to the greater torque, the end-thrust forces indicated by the various arrows in FIGS. 2, 4, and 5 would still remain the same, provided that the vehicle is still being driven forward by its engine. For instance, in FIG. 5, if torque were being transferred instead from sun gear 116, its left hand helical teeth would also be driving clockwise (when viewed from the left) and, thereby, would still be developing end thrust in the direction of open arrow 176. Similarly, the right hand teeth of first engagement portion 128 of combination gear 124 would be driven counterclockwise and would thereby develop end thrust again in the direction of hatched arrow 174, etc.

On the other hand, when the vehicle is in a "coast" (as different from "drive") mode, the driving torques to which the sun gears are subjected are in a counterclockwise direction, and the end-thrust forces indicated by the various arrows in FIGS. 2, 4, and 5 would all be reversed. Therefore, referring again to the embodiment shown in FIG. 5, when the vehicle is coasting and its engine is exerting a braking effect, the differential is subjected to torque in the opposite direction; and the resulting end thrust developed by all of its gears is reversed. This embodiment of the invention also provides multi-stage bias characteristics under such "coast" conditions.

Sun gears 114, 116 are lightly biased in the direction of open arrows 166, 176 by respective Bellville springs 178, 180 positioned between the outer-end faces 182, 184 of the gears and respective washers 186, 188. Under low torque "coast" conditions, the force of springs 178, 180 is sufficient to retain sun gears 114, 116 in their respective positions as shown in FIG. 5. However, when the gears are subjected to higher torque in the coast mode, the end thrust exerted by their respective helical teeth (in directions opposite to those indicated by open arrows 166, 176) overcomes the bias of springs 178, 180 and permits the respective hubs 190, 192 to come into contact with bearing surfaces 194, 196 of housing 115 to increase the frictional resistance of the unit.

Similarly, under coast conditions, the end thrust on combination gears 122, 124 becomes reversed, causing them to move in directions opposite to those indicated by solid arrows 168, 170 and hatched arrows 172, 174. Therefore, under higher torque "coast" conditions, the bias of springs 156b and 156c is overcome by the end thrust developed by each respective combination gear, bringing the right hand end face of gear 122 into contact with bearing 160 and bringing the left hand end face of gear 124 into contact with its respective bearing 162.

Of course, when the differential illustrated in FIG. 5 is under low torque conditions, the bias provided by the various spring elements maintains the end faces of the various gears out of contact with each other and/or their respective bearing surfaces, thereby reducing the torque bias of the differential under such low torque conditions. However, by selecting the gearing according to the invention herein, the torque bias of the differential under higher torque conditions is significantly increased. That is, if the assembly of FIG. 5 were instead provided with conventional gearing (such as that shown in the prior-art differentials of FIGS. 1a and 1b) in which both the first and second engagement portions of each combination gear are provided with teeth of the same helix angle, the resulting thrust forces acting on each of the planetary combination gears would be opposed, and this would effectively reduce the frictional resistance provided by any contact between these gears and their respective bearing surfaces.

Therefore, the invention herein can be used to increase the end-thrust forces used for determining and controlling the torque bias characteristics of most parallel-axis/torque-proportioning differentials.

We claim:

1. A gear differential having a planetary gearing arrangement comprising:
    a housing that is rotatable about a pair of axle shafts which share a common axis;
    a pair of sun gears positioned within said housing relative to respective bearing surfaces and adapted to be fixed to the respective ends of said axle shafts for rotation;
    at least one pair of planet gears, each gear of the pair being mounted within said housing for rotation about a respective axis which is parallel to said common axis, and for axial movement:
        (a) in relation to, and for contact with, at least one respective bearing surface, and
        (b) in relation to its paired planet gear;
    said sun and planet gears having helical teeth and exerting axial end thrust against their respective bearing surfaces when subjected to torque; and
    each planet gear having a first engagement portion with helical teeth for meshing with a respective one of said sun gears and a second engagement portion for meshing with its paired planet gear, said first and second engagement portions having teeth designed so that said axial end thrust exerted by said planet gears is at least equal to the end thrust exerted by said sun gears.

2. The gear differential of claim 1 wherein said first and second engagement portions have teeth designed so that said axial end thrust exerted by said planet gears is greater than the end thrust exerted by said sun gears.

3. The gear differential of claim 1 wherein the gear teeth of said second engagement portion are also helical but of opposite hand to the gear teeth of said first engagement portion.

4. The gear differential of claim 1 wherein said second engagement portion comprises spur teeth.

5. A differential assembly comprising:
    a housing;
    a pair of sun gears positioned in said housing for receiving a pair of respective axle ends for rotation therewith about a common axis, said sun gears having helical teeth;
    at least one pair of combination gears, each gear of said pair:
        being supported in said housing for rotation about a respective axis parallel to said common axis and for axial movement (a) relative to at least one bearing surface and (b) relative to its paired combination gear, and
        having a first engagement portion with helical teeth in mesh with a respective one of said sun gears and a second engagement portion in mesh with its paired combination gear;
    the meshing engagement of said sun and combination gears interconnecting said respective axle ends in a mutual driving relationship; and
    said first and second engagement portions of each combination gear having respective first and second gear tooth designs selected so that, when said combination gear is subjected to torque of a first direction,
        (a) said first engagement portion develops axial end thrust in a first direction against said bearing surface, and
        (b) said second engagement portion develops no axial end thrust in the opposite direction.

6. The assembly of claim 5 wherein said second selected tooth design also causes said second engagement portion to develop axial end thrust in said first direction.

7. The assembly of claim 5 wherein said second tooth design comprises helical teeth but of opposite hand to the gear teeth of said first tooth design.

* * * * *